United States Patent [19]
Hashimoto et al.

[11] 4,394,081
[45] Jul. 19, 1983

[54] MAGNETICALLY CONTROLLED SHUTTER

[75] Inventors: Teiji Hashimoto; Syuichiro Saito, both of Kawasaki, Japan

[73] Assignee: Canon Kabushiki Kaisha, Tokyo, Japan

[21] Appl. No.: 292,733

[22] Filed: Aug. 14, 1981

[30] Foreign Application Priority Data

Aug. 28, 1980 [JP] Japan .................................. 55-118607

[51] Int. Cl.³ ................................................ G03B 9/62
[52] U.S. Cl. ................................................... 354/234
[58] Field of Search ......................................... 354/234

[56] References Cited
U.S. PATENT DOCUMENTS 3,947,857  3/1976  Kiyoshi et al. ...................... 354/234
4,315,678  2/1982  Tsunefuji ........................ 354/234 X Primary Examiner—Michael L. Gellner
Attorney, Agent, or Firm—Toren, McGeady and Stanger

[57] ABSTRACT

Disclosed is a magnetically controlled focal plane shutter wherein one electromagnet controls a leading shutter curtain and another electromagnet controls a following shutter curtain by releasing respective checking members as power is supplied thereto. The electromagnetic characteristics of the electromagnet that controls the following shutter curtain differ from those of the electromagnet controlling the leading shutter curtain. According to a specific embodiment disclosed, the follower-curtain controlling electromagnet saturates earlier than the leading curtain controlling magnet so as to compensate for deterioration of an energizing battery and thereby limits the problem of shutter time lag resulting from the long battery use.

8 Claims, 4 Drawing Figures

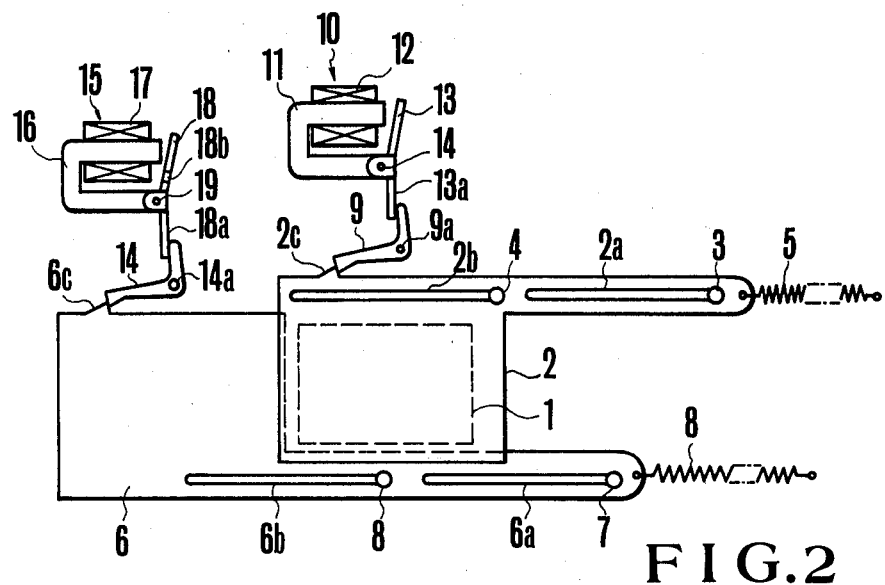
FIG.1
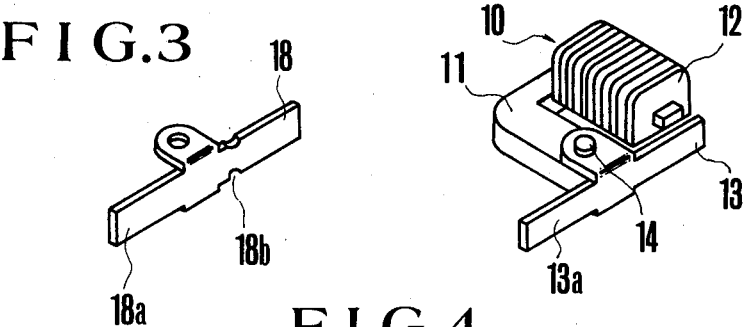
FIG.2
FIG.3
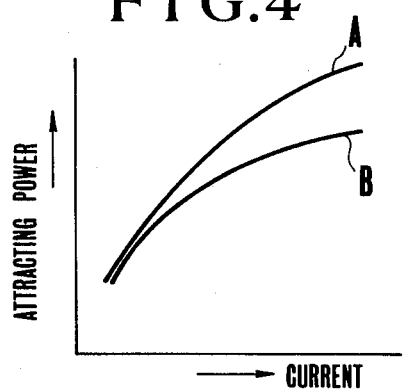
FIG.4

MAGNETICALLY CONTROLLED SHUTTER

BACKGROUND OF THE INVENTION

1. Field of the Invention

This invention relates to camera shutters, particularly to shutters in which electromagnets control release of front and rear shutter curtains.

2. Description of the Prior Art

A known electromagnetically controlled shutter arrangement supplies power to an electromagnet or electromagnets beforehand to attract and retain an armature, and the thus supplied current is shut off as required to separate the armature from the magnet. Thus, the shutter is controlled by utilizing this power. While this type of shutter has the advantage of consuming only a small amount of power, it is not necessarily advantageous with respect to manufacturing costs. Abrasion of an attracting surface occurs and an equalizer for causing the armature uniformly to adhere to the electromagnet as well as a charging mechanism for pressing the armature against an attracting surface are necessary.

In contrast, an electromagnetically controlled shutter of the so-called attracting type releases shutter curtain checking devices by supplying power to an electromagnet for attracting an armature. This introduces some shortcomings with respect to power consumption, but reduces manufacturing costs.

Unfortunately, shutters of the latter type have the drawback of permitting the shutter speed to become gradually slower when the power source battery has been used for a long time and is unable to provide sufficient power. This is so because power is supplied to the rear curtain controlling electromagnetic after the power supplied to the front curtain electromagnet has caused a voltage drop. Thus, deterioration of the battery affects the electromagnet for the rear curtain more than the electromagnet for the front curtain. This weakens the attractive power of the rear curtain electromagnet and results in increasing time lags from the moment power is supplied to the rear curtain electromagnet until the moment the rear curtain is released as the battery deteriorates. To eliminate this shortcoming, power may be stored in a capacitor and voltage may be boosted, as required, and such stored power may be used. However, such methods require additional circuitry which demand additional space, and are thus not advantageous. Also, a constant current circuit may be used. However, the disadvantage of such a circuit is the need for an additional battery to compensate for voltage losses.

SUMMARY OF THE INVENTION

An object of the present invention is to provide an electromagnetically controlled shutter in which the above-mentioned shortcomings are eliminated and which is only slightly affected by the variation of a voltage in its power source.

It is another object of the invention to provide a magnetically controlled shutter in which attracting characteristics that is a relationship between current and attracting power of an electromagnet is varied between an electromagnet for a front curtain and that for a rear curtain so that such electromagnet that variation in attracting power derived from a change in current is comparatively averaged out is used for a rear curtain.

These and further objects and features of the invention will become apparent from the following detailed descriptions of an embodiment thereof taken in connection with the accompanying drawings.

BRIEF DESCRIPTION OF THE DRAWINGS

FIG. 1 is a schematic view of an electromagnetically controlled shutter embodying features of the invention.

FIG. 2 is an oblique view of an electromagnet, shown in FIG. 1, a front shutter curtain.

FIG. 3 is an oblique view illustrating an armature of an electromagnet, shown in FIG. 1 for a rear shutter curtain.

FIG. 4 is a diagram which illustrates attracting characteristics of electromagnets shown in FIG. 1.

DESCRIPTION OF THE PREFERRED EMBODIMENT

In FIG. 1, a frame outlining aperture 1 is covered by a front shutter curtain 2 which is guided by guide grooves 2a and 2b and guide pins 3 and 4 so that it runs linearly to the right in response to being pulled to the right by a spring 5. A projection 2c engages a checking or check lever 9 which stops the curtain 2 at the position shown in the drawing in the cocked or charged state of the shutter. A rear shutter curtain 6 with guide grooves 6a and 6b that ride in guide pins 7 and 8 is pulled by a driving spring 8 to run to the right in the drawing. A projection 6c engages the checking or check lever 14 to stop the curtain 6 in the charged or cocked state. A front-curtain electromagnet 10 for the front shutter curtain, shown in FIGS. 1 and 2, includes a yoke 11, a coil 12 and an armature 13 rotatable about a pin 14. A rear-curtain electromagnet 15 for the rear shutter curtain has a setup which is the same as that for the electromagnet 10 for the front curtain and includes a yoke 16, a coil 17, and an armature 18 rotatable about a pin 19.

In operation, as power is supplied to the coil 12 of the front curtain magnet 10, the armature 13 is attracted and rotated then strikes the checking lever 9 with its end 13a, causing the lever 9 to rotate around a shaft 9a to release the front curtain 2, so the front curtain 2 runs in response to the power of the spring 5.

When power is supplied to the coil 16 of the rear curtain magnet 15 after an elapse of a prescribed length of time determined by an object brightness from a moment the front curtain starts running, the armature 18 is attracted and rotated and its end 18a strikes the checking lever 14 to rotate the lever 14 around a shaft 14a for releasing the rear curtain. Thus, the rear curtain runs in response to the power of the spring 8 to close the shutter.

In the shutter having the above-mentioned set up, the armature 18 of the rear curtain magnet 15 has a notch 18b at a part shown in FIG. 3. Thus, it magnetic path is partially narrowed. Therefore saturation of magnetic flux starts earlier than in the electromagnet 10 shown in FIG. 2, and the attracting characteristics of the magnet 18 become different from those of the front curtain magnet. This is shown in FIG. 4. That is, line A in FIG. 4 is a characteristics curve of the ordinary electromagnet for the front shutter curtain in which attracting power lowers with a reduction of current value. Line B is a characteristics curve for the electromagnet for the rear shutter curtain, in which a rate of lowering of attracting power due to a reduction in current value is very small as compared with the line A.

Therefore even when a battery becomes old, the attracting power of the electromagnet for the rear shutter curtain changes little so that its effect on the shutter speed, as mentioned above, can be made very small.

While a portion of a magnetic path in narrowed in the example as a method of changing attracting characteristics, the kind of material of the iron core may be changed for a same purpose. That is, same purpose may be attained by using pure iron in the electromagnet for the front shutter curtain, while total iron core or a portion thereof in the electromagnet for the rear shutter curtain is changed to 45 permalloy or 78 permalloy, etc. Also a position at which a portion of a magnetic path is narrowed may be any place of the yoke or armature except the attracting surface.

Since the present invention has an arrangement in which the ratio of change in attracting power relative to change in current value in an electromagnet for controlling a rear shutter curtain of an electromagnetically controlled shutter is made small as explained, a shutter in which a shutter speed is stabilized regardless of a variation in a power source voltage can be manufactured with a very simple structure and a low cost.

Also, the present invention is not to be limited to a slit shutter as shown in the above example, instead it can be similarly applied to a lens shutter or a focal plane shutter as long as a shutter has shutter opening blades and shutter closing blades and each of the blades is controlled by electromagnets.

What is claimed is:

1. A magnetically controlled shutter comprising: a leading shutter blind and a following shutter blind, a leading checking member for holding the leading shutter blind, a following checking member for holding the following shutter blind, and a leading electromagnet for controlling the leading shutter blind and a following electromagnet for controlling the following shutter blind, each acting on the respective checking members as power is supplied thereto for releasing a checking thereof, the electromagnet for controlling the following shutter blind having magnetic action characteristics different from those of the electromagnet for controlling the leading shutter blind, wherein said electromagnets are attraction type magnets, and wherein said electromagnets have respective yokes made of different magnetic substances.

2. A magnetically controlled shutter comprising: a leading shutter blind and a following shutter blind, a leading checking member for holding the leading shutter blind, a following checking member for holding the following shutter blind, and a leading electromagnet for controlling the leading shutter blind and a following electromagnet for controlling the following shutter blind, each acting on the respective checking members as power is supplied thereto for releasing a checking thereof, the electromagnet for controlling the following shutter blind having magnetic action characteristics different from those of the electromagnet for controlling the leading shutter blind, said electromagnets are attraction type magnets, wherein said electromagnets have respective armatures for releasing said checking members, and wherein the armature of said following electromagnet for controlling the following shutter blind is formed to produce saturation of magnetic flux more rapidly than the following electromagnet for controlling the leading shutter blind.

3. A magnetically controlled shutter according to claim 2, wherein said armature of the following electromagnet for controlling the following shutter blind has a partially narrow portion.

4. A magnetically controlled shutter according to claim 2, 3, or 1, wherein said electromagnets are energizable by a battery and wherein said electromagnet for controlling the shutter blind has a characteristic magnetic action such that the magnetic action is compensated with respect to the action of said electromagnet for controlling the leading shutter blind when the battery has deteriorated due to long use.

5. A magnetically controlled shutter according to claim 3 or 2 or 1, wherein said electromagnets are energizable by a battery and wherein said electromagnet for controlling the following shutter blind has a characteristic of magnetic action such as to compensate for a time lag of a shutter speed on the deterioration of the battery.

6. An electromagnetically controlled shutter comprising:
   a leading shutter blind and a following shutter blind;
   a leading checking member for holding the leading shutter blind;
   a following checking member for holding the following shutter blind; and
   a leading electromagnet for controlling the leading shutter blind and a following electromagnet for controlling the following shutter blind, each acting on the respective checking members as power is supplied thereto for releasing a checking thereof, wherein said electromagnets are attraction type magnets and have respective armatures for releasing said checking members and wherein the armature of said following electromagnet for controlling the following shutter blind is formed to produce saturation of magnetic flux more rapidly than the leading electromagnet for controlling the leading shutter blind.

7. An electromagnetically controlled shutter according to claim 6, wherein said armature of the following electromagnet for controlling the following shutter blind has a partially narrow portion.

8. An electromagnetically controlled shutter comprising:
   a leading shutter blind and a following shutter blind;
   a leading checking member for holding the leading shutter blind;
   a following checking member for holding the following shutter blind; and
   a leading electromagnet for controlling the leading shutter blind and a following electromagnet for controlling the following shutter blind, each acting on the respective checking members as power is supplied thereto for releasing a checking thereof, wherein said electromagnets are attraction type magnets and have respective yokes made of different magnetic substances.

* * * * *